(12) United States Patent
Kloepzig et al.

(10) Patent No.: US 6,998,755 B2
(45) Date of Patent: Feb. 14, 2006

(54) ELECTRONICALLY-COMMUTATED ELECTRIC MOTOR COMPRISING COILS WITH PARALLEL AXES

(75) Inventors: Markus Kloepzig, Spaichingen (DE); Jürgen Oelsch, Hohenroth (DE)

(73) Assignee: Minebea Co., Ltd., Nagamo-Ken (JP)

( * ) Notice: Subject to any disclaimer, the term of this patent is extended or adjusted under 35 U.S.C. 154(b) by 0 days.

(21) Appl. No.: 10/487,273

(22) PCT Filed: Aug. 21, 2002

(86) PCT No.: PCT/EP02/09358

§ 371 (c)(1),
(2), (4) Date: Jul. 30, 2004

(87) PCT Pub. No.: WO03/026106

PCT Pub. Date: Mar. 27, 2003

(65) Prior Publication Data

US 2004/0239207 A1    Dec. 2, 2004

(30) Foreign Application Priority Data

Sep. 19, 2001  (DE) ................................ 101 46 123

(51) Int. Cl.
*H02K 1/12*           (2006.01)
(52) U.S. Cl. ....................................... 310/254; 310/216
(58) Field of Classification Search ............. 310/49 R, 310/156.01, 216–218, 254–259, 190
See application file for complete search history.

(56) References Cited

U.S. PATENT DOCUMENTS

| | | | |
|---|---|---|---|
| 4,029,980 A | | 6/1977 | Gamble |
| 4,353,602 A | * | 10/1982 | Habermann ................. 310/90.5 |
| 4,680,494 A | * | 7/1987 | Grosjean ................ 310/156.35 |
| 5,659,217 A | | 8/1997 | Petersen |
| 5,691,583 A | * | 11/1997 | Suzuki et al. ............. 310/49 R |
| 5,854,526 A | | 12/1998 | Sakamoto |
| 6,774,512 B1 | * | 8/2004 | Takagi et al. ............. 310/49 R |

FOREIGN PATENT DOCUMENTS

| | | |
|---|---|---|
| DE | 1018142 | 10/1957 |
| DE | 19818035 | 10/1999 |
| JP | 63077364 | 7/1988 |

* cited by examiner

*Primary Examiner*—Thanh Lam
(74) *Attorney, Agent, or Firm*—Mark C. Comtois; Duane Morris, LLP (57) ABSTRACT

The invention relates to an electronically commutated electric motor having a multi-pole magnetized permanent magnet, a plurality of flux guide units each of which features at least one flux collector section and one flux concentrator section, whereby each flux guide unit picks up a radial magnetic flux from the permanent magnet and redirects it into a transversal magnetic flux, and having a plurality of coils each of which is allocated to a flux guide unit and is arranged axially parallel to the permanent magnet.

22 Claims, 10 Drawing Sheets

ELECTRONICALLY-COMMUTATED ELECTRIC MOTOR COMPRISING COILS WITH PARALLEL AXES

This application claims priority to the filing date of German Patent Application No. 101 46 123.2 filed Sep. 19, 2001, and the PCT Application No. PCT/EP02/09358 filed Aug. 21, 2002; the specification of both of these appications are incorporated herein in their entirety.

FIELD OF THE INVENTION

The invention relates to an electronically commutated electric motor with an n-pole radially or diametrically magnetized permanent magnet that combines the advantages of a radial flux design and a transversal flux design. For this purpose, the invention proposes a new design for an electronically commutated electric motor.

BACKGROUND OF THE INVENTION

A description of the prior art concerning high-performance electronically commutated electric motors is cited by Hendershot in "Design of Brushless Permanent Magnet Motors". According to this, an electronically commutated electric motor consists of the following characteristic components:

1. Stationary stator and rotor in a radial flux design

The stator consists, for example, of a laminated iron ring and a winding mostly made up of three phases. The laminations of the iron ring are subdivided into the characteristic parts of tooth, hammer and back iron yoke. The winding is inserted in the area enclosed by the tooth, hammer and back iron yoke. The area in which the winding is inserted is called a "slot". The iron ring can be designed to suit various slot configurations.

The rotor consists of a back iron yoke and the permanent magnet generating the flux. The permanent magnet can be composed of several segments; it is preferably made from a single piece and n-pole radially or diametrically magnetized. The number of poles (P) corresponds to the number of magnetized pole areas with alternating polarity. The rotor can be designed as an inner or outer rotor motor. For outer rotor motors, the stator is designed with the back iron yoke located inside and the tooth and hammer pointing towards the outside. For inner rotor motors the stator is designed with the back iron yoke on the outside and the tooth and hammer pointing towards the inside. The magnet on the rotor of an outer rotor motor is located inside and the back iron yoke outside. The magnet on the rotor of an inner rotor motor is located outside and the back iron yoke inside.

This motor design is based on the radial flux principle; i.e. the magnetic flux penetrates the coils in relation to the permanent magnet and its rotational axis in an essentially radial direction. The required offset in the phases of the motor depends on the number of slots, poles and phases and is set by placing the phase windings in different areas of the stator.

2. Commutation device

The motor should be designed with a commutation device which, dependent on the position of the rotor, selects the energizing pattern for the coils that generates maximum torque. The commutation device mostly takes the form of Hall position sensors in combination with a sensor magnet and a MOSFET power amplifier. Here, the Hall position sensors detect the momentary position of the rotor and trigger the MOSFET power amplifier in the required manner.

For electronically commutated motors of the described construction, many different combinations of numbers of poles (2P) and of slots (n) are known. Through the choice of the number of poles and slots, the motor can be adapted to various requirements, such as a trapezoid torque waveform, sinoid torque waveform, low detent torque etc. For especially low detent torque a cant of $2\pi/n$ for the pole transitions between the magnets is frequently suggested.

The main disadvantages of the standard motor design for electronically commutated motors lie in the costly manufacturing processes to fabricate the windings for inner rotor motors, and the lack of a stationary housing and the high costs of magnets for outer rotor motors.

3. Stator and rotor in a transversal flux design

For each motor phase in a transversal flux machine, a rotor section with a permanent magnet, or with a permanent magnet section, is provided that has magnetized, alternating poles. The stator has flux guide units with claws to redirect the radial magnetic flux into a transversal magnetic flux, whereby the claws extend parallel to the rotational axis of the permanent magnet net and in the vicinity of the magnetic pole surfaces of the permanent magnet. Each flux guide unit belonging to a phase of the transversal flux machine encloses a concentrically wound toroid coil which, in relation to the permanent magnets, is essentially enclosed by the magnetic flux in a longitudinal direction. For each multiphase transversal flux machine, several such rotor/stator units are arranged next to each other on one axis or stacked one on top of the other, whereby the required offset of the phases is achieved by using several permanent magnets or magnet sections which are offset in relation to each other, or by stacking the stator units with the appropriate offset in the angle of rotation. Each phase thus has its own pole or armature system having a rotor with a permanent magnet, a stator and a dedicated toroid coil. The number of flux collectors or claws corresponds to the number of poles.

An example of a known transversal flux machine with further references to the prior art can be found in DE 198 18 035 A1.

Although the transversal flux design has the advantage of a simpler winding technique for the coils, it requires a higher magnetic volume compared to the radial flux machine to generate a comparable magnetic flux. Moreover, the transversal flux machine has the disadvantage that the number of magnetic poles has to correspond to the number of flux collectors or claws on the flux guide units which goes to restrict the means of influencing the torque waveform for the transversal flux machine.

U.S. Pat. No. 5,854,526 describes a direct current motor having a multi-pole permanent magnet and several flux guide units. Each flux guide unit has a flux collector section and flux concentrator section, whereby each flux guide unit picks up a radial magnetic flux from the permanent magnet and redirects it into a transversal magnetic flux. In addition, the motor has several coils arranged axially parallel to the permanent magnet. The purpose of the motor design revealed in this patent is to provide a low-cost DC motor with a large torque and good performance which can be manufactured with precision.

DE 1 018 142 describes a self-running synchronous motor with two coaxially attached coils that have serrate pole plates made of ferromagnetic material at their ends featuring an approximately even number of annular teeth. The teeth of two pole plates belonging to different coils are combined together to form one tooth. The purpose of this arrangement is to increase the number of pole divisions per unit of length.

The object of the present invention is to provide a new principle for an electronically commutated electric motor which has coils that are easy to wind, which can achieve a comparable performance in relation to known radial flux machines and which allows any desired combination of the number of poles of the permanent magnet and the number of slots of the stator to enable the torque waveform to be influenced according to requirements.

SUMMARY OF THE INVENTION

This object has been achieved through an electronically commutated electric motor having the characteristics outlined in claim 1. Preferred embodiments of the invention are given in the sub-claims.

The electric motor presented in the invention has a rotor with magnet segments or with a one-piece multi-pole magnetized permanent magnet, and several flux guide units each of which have at least one flux collector section, preferably several flux collector sections, whereby the flux guide unit picks up a radial magnetic flux from the permanent magnet and redirects it into a transversal magnetic flux. The electric motor additionally includes several coils each of which is allocated to one of the flux guide units and arranged axially parallel to the permanent magnet and its rotational axis.

By nesting several flux guide units for several phases of the electric motor within each other, as described in further detail below, it is possible to realize a multiphase electric motor which operates with a single radially magnetized permanent magnet and, for each phase, features one or more annular axially parallel coils which, however, in contrast to the conventional transversal flux machine are not concentric to the permanent magnet but rather (for an inner rotor motor) arranged on its outer circumference parallel to the rotational axis of the permanent magnet. For an outer rotor motor, the coils are accordingly arranged on the inner circumference of the permanent magnet. This allows the coils to be more easily wound than is the case with radial flux machines and it also allows for a more compact construction than is the case with conventional transversal flux machines. In particular, the invention allows the use of simple pre-fabricated coils, so-called preformed coils, which makes the electric motor considerably easier to manufacture.

The permanent magnet of the present invention is either a single piece or made up of segments and arranged on a rotor with a back yoke ring, and the coils are on coil cores which are coupled with the flux concentrator and a back iron yoke. In a preferred embodiment of the invention, each flux concentrator section of a flux guide unit forms a ring or a ring section which is essentially concentric to the permanent magnet. In this context, a ring is not necessarily circular in shape and the flux concentrator can rather be formed as a polygon, an oval or suchlike. The flux collectors are arranged at the inner circumference of the flux concentrator rings (for an inner rotor motor design; for an outer rotor motor, at the outer circumference) and extend essentially parallel to the rotational axis of the permanent magnet and are located in the vicinity of its poles. The function of the flux collector sections is similar to that of the hammer in the stator stack of a radial flux machine so that in the electric motor of the present invention, almost any required combination of numbers of poles and of slots can be realized.

The motor presented in the invention can take the form, for example, of any known design variations for three-phase electronically commutated DC motors that operate with concentrated windings. These include, for example, the variations of six slots (according to the flux collector sections) with four poles, nine slots with six poles, twelve slots with eight poles and all other variations which satisfy the equation number of slots (no. of flux collector sections)
=1.5×number of poles.

Moreover, special designs such as 12 slots with 10 poles and 12 slots with 14 poles etc. can be realized. By concentrating the magnetic flux of the individual flux collector sections in the associated flux concentrator section, the number of coils per phase can also be varied.

According to the invention, for each phase of the electric motor, several coils, preferably one or two coils, can be provided which are arranged on coil cores which are connected to the respective flux concentrator section of an associated flux guide unit. The coil core sections extend essentially parallel to the rotational axis of the permanent magnet and are connected at the end lying opposite the flux concentrator section to a common magnetic back yoke ring. This design even allows the number of coils per phase to be varied.

A particularly compact design of the electric motor of the present invention is achieved in that the flux guide units are coaxially arranged one on top of the other and nesting into each other in such a way that the flux collector sections and the coil cores of an outer flux guide unit, both of which extend parallel to the axis of the permanent magnet, pass through an inner flux guide unit through appropriate cutouts. The flux collector sections of the individual flux guide units are offset in relation to each other in such a way that they end up lying regularly spaced in a concentric circle around the permanent magnet.

In a particularly preferred embodiment of the invention, this outermost flux guide unit and the back iron yoke can be designed in such a way that they each carry bearings to support a rotor shaft. To magnetically de-couple the rotor and stator, the rotor shaft can, for example, be made of a magnetically non-conductive material, or any other suitable form of de-coupling, for example in the bearings, can be provided. By accommodating the shaft bearings in the magnetic ring, the motor flanges normally required for this purpose are no longer needed.

All parts of the magnetic ring, i.e. in particular the flux guide units and the magnetic back yoke ring can be manufactured as simple molded sheet-metal parts which means that the motor can be manufactured quickly and effectively. As an option, parts of the iron ring can also be made from sheet metal.

The electric motor presented in the invention enables many different combinations in the number of poles and slots—as is usual for radial flux machines—to be realized in a transversal flux arrangement, whereby the coils can take the form of toroid coils which are much easier to wind. The arrangement of the axially parallel coils on the circumference of the permanent magnet allows the flux guide units and coils for the respective phases to be nested into each other in such a way that for all phases a single multi-polar permanent magnet can be used, which results in a more compact design than is usual for transversal flux machines. The invention has the additional advantage that the bearings for the rotor shaft can be accommodated in the magnetic ring so that additional motor flanges are not necessary.

SHORT DESCRIPTION OF THE DRAWINGS

These and other advantages of the invention can be derived from the following description of preferred embodiments with reference to the drawings. In the figures.

DETAILED DESCRIPTION OF PREFERRED EMBODIMENTS

Figure 1:
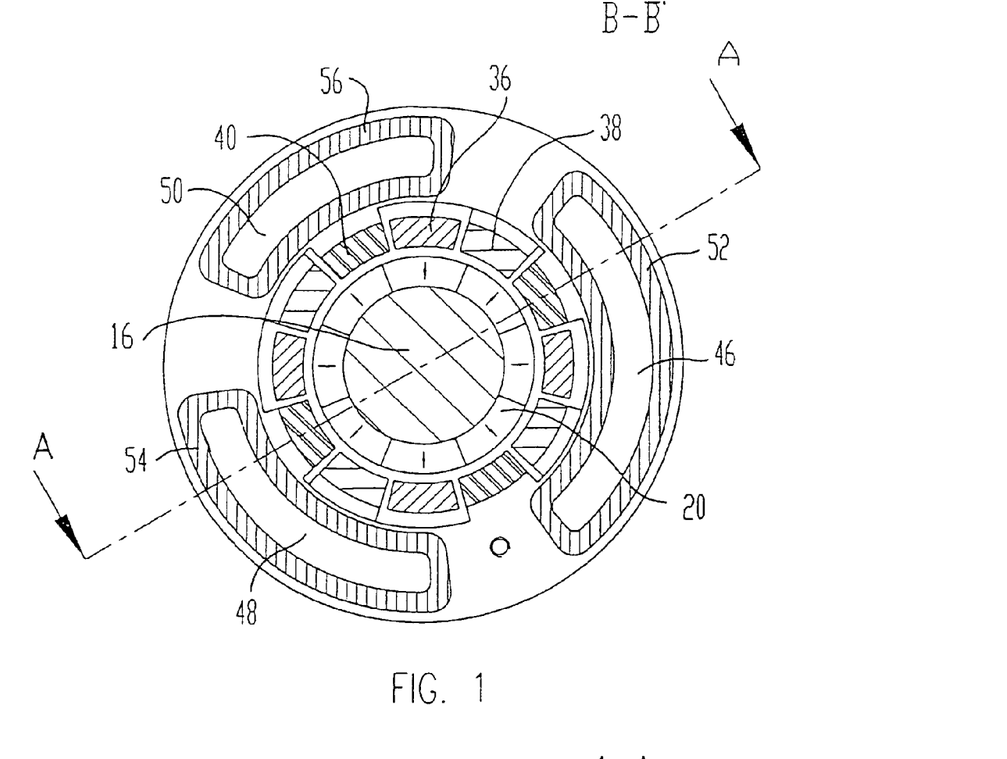
FIG. 1 shows a schematic cross-section through electric motor in accordance with a first embodiment of the invention along the line B—B in FIG. 2.
Figure 2:
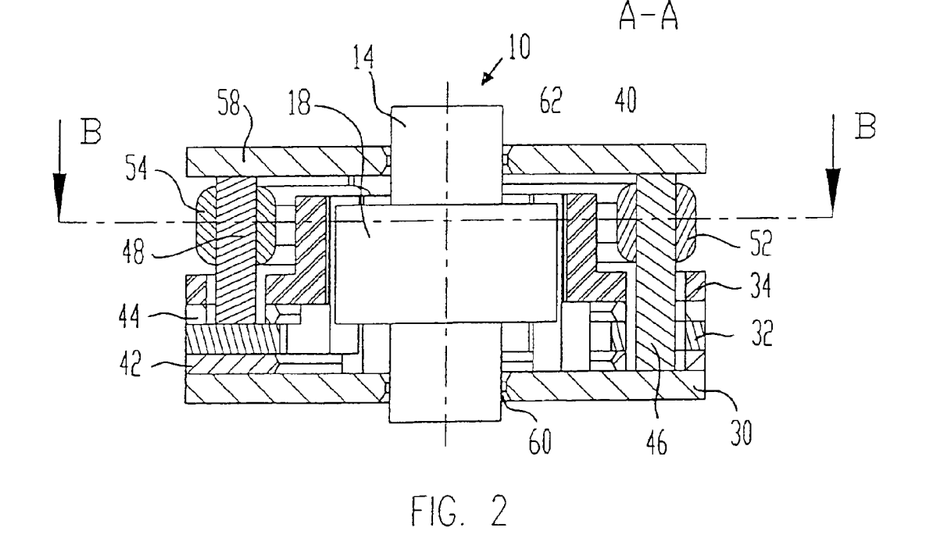
FIG. 2 shows a schematic longitudinal view through the electric motor in accordance with a first embodiment of the invention along the line A—A in FIG. 1.

In FIGS. 1 and 2, a preferred embodiment of an electronically commutated DC motor in accordance with the invention is shown, whereby FIG. 1 is a cross-section of the motor along the line B-B in FIG. 2 and FIG. 2 is a longitudinal view of the motor along the line A—A in FIG. 1.

The electric motor of the invention has a rotor 10 and a stator 12, whereby the illustrated motor is constructed according to the principle of an inner rotor motor. However, the invention can be equally applied to outer rotor motors, whereby the technician can reverse the structure of the motor described below in order to design it as an outer rotor motor.

The rotor 10 includes a rotor shaft 14, a back yoke 16 which is located on the rotor shaft 14 and a multi-pole magnetized permanent magnet 18, which can take the form of a permanent magnet ring or a segmented permanent magnet. FIG. 1 shows a permanent magnet 18 with eight poles 20, 22, without the invention of course being restricted to a specific number of poles.

The electric motor shown in FIG. 1 and 2 has three flux guide units 24, 26, 28 each having an annular flux concentrator section 30, 32, 34 and, in the embodiment illustrated, four flux collector sections 36, 38, 40. The flux guide units 24, 26, 28 are magnetically de-coupled by means of a layer made of a paramagnetic or diamagnetic material 42, 44, such as aluminum.

Opposite the flux guide units 24, 26, 28 is a common back iron yoke 58 that carries three coil cores 46, 48, 50 each of which accommodates a toroid coil 52, 54, 56 which extend axially parallel to the rotor shaft 14 and the permanent magnet 18. The coils 52, 54, 56 for the inner rotor construction illustrated in the figures, are equally distributed around the circumference of the permanent magnet 18 as shown in FIG. 1.

At the ends located opposite to the back iron yoke 58, the coil cores 46, 48, 50 are connected to the associated flux concentrator sections 30, 32, 34 of the flux guide units 24, 26, 28. A magnetic circuit is formed via the flux collector sections, the flux concentrator sections, the coil cores and the back iron yoke, whereby, in operation, the toroid coils 52, 54, 56 are transversally penetrated by the magnetic field.

Finally, in FIG. 2 bearings 60, 62 are also shown which are used to support the rotor shaft 14, whereby a first bearing 60 is supported by the outer flux guide unit 24 and the second bearing 62 is supported by the back iron yoke 58.

In the illustrated embodiment of the electric motor presented in the invention, three flux guide units 24, 26, 28 with their associated coils 52, 54, 56 are provided for the three phases of an electronically commutated DC motor that can be energized via a commutation device in a manner known to the technician. A particularly compact design is achieved when the flux guide units 24, 26, 28 are nested within each other and the outermost flux guide unit 24 as well as the back iron yoke 58 can accommodate the bearings 60, 62 for the rotor shaft 14.

Figure 3:
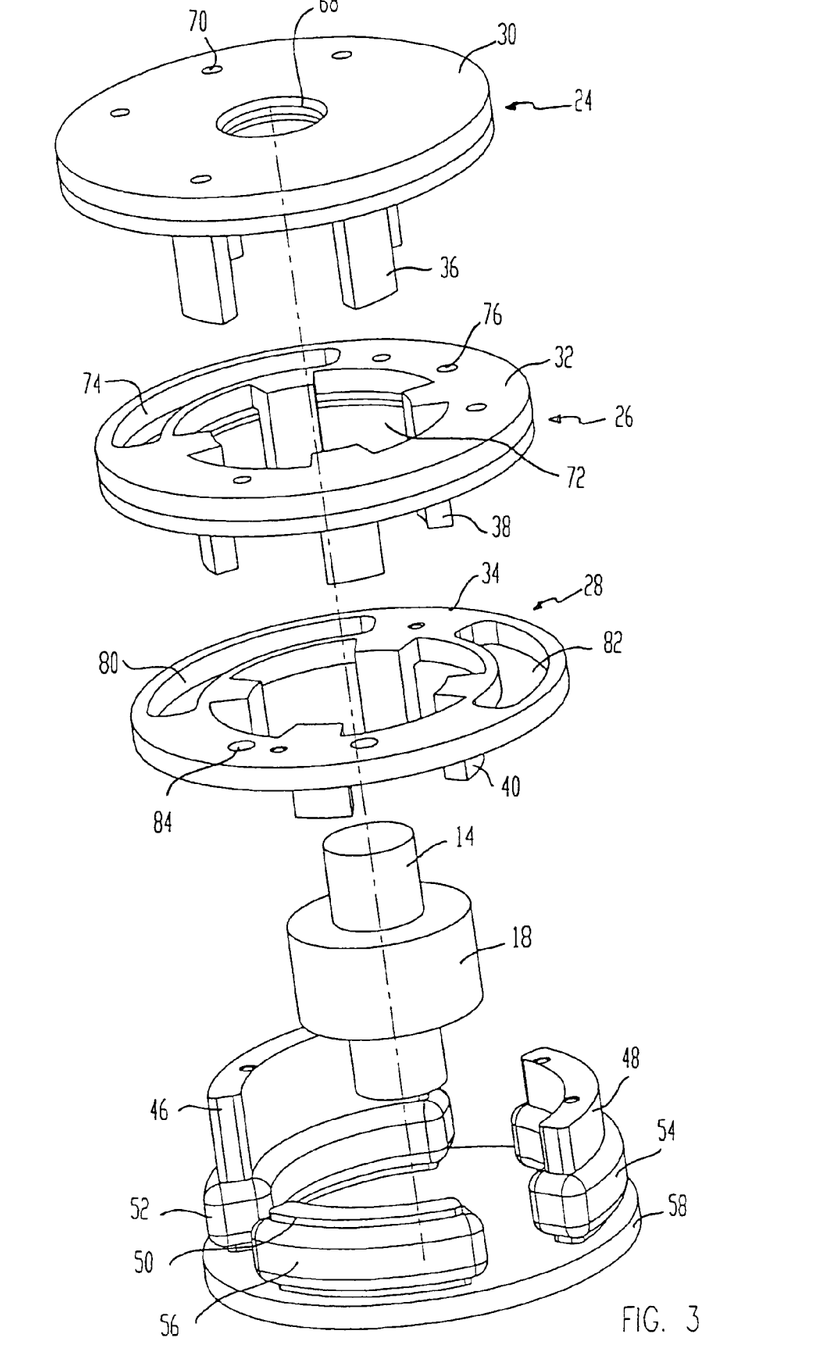
FIG. 3 shows a perspective exploded view of the electric motor in accordance with a first embodiment of the invention.

A preferred design for the flux guide units, the back iron yokes and the coil cores can be more clearly seen from FIG. 3. It should be noted that all figures are schematic views of the invention, whereby the individual components of the electric motor presented in the invention can be realized in various ways. The components can, for example, be turned, milled or formed through punch/bending processes.

FIG. 3 schematically shows the electric motor in accordance with the invention in a perspective exploded view. FIG. 3 shows the disc-shaped back iron yoke which is formed from a flat annular disc made from a magnetically conductive material and has holes (not illustrated) to attach the coil cores 46, 48, 50 as well as a bearing carrier at its center (not illustrated in FIG. 3) to accommodate the rotor shaft bearing. The coil cores 46, 48, 50 can be attached to the back iron yoke 58 via the holes by means, for example, of screws or rivets (not illustrated). Each coil core carries a toroid coil 52, 54 or 56 respectively.

FIG. 3 also shows an outer, a middle and an inner flux guide unit 24, 26 or 28 respectively in further detail.

The outer flux guide unit 24 has an annular flux concentrator section 30 and four flux collector sections 36 on its inner circumference extending perpendicular to it. The flux concentrator section 30 features a central hole with a bearing carrier 68 to accommodate the bearing 60 supporting the rotor shaft 14. The flux concentrator section 30 additionally features holes 70 distributed around its circumference for the purpose of attaching the coil core 46 by means of screws or suchlike.

The flux guide units 24, 26, 28 have a basically similar structure to each other but are so adapted that they can be nested within each other.

The middle flux guide unit 26 features an annular flux concentrator 32 and four flux collector sections 38 on its inner circumference extending perpendicular to it. The flux concentrator section 32 features a central opening 72 to let the flux collector sections 36 of the outer flux guide unit 24 pass through, whereby in a mounted condition, the flux collector sections 36 and the flux collector sections 38, which lie on the same radius, are offset in relation to each other in such a way that they end up lying next to each other as shown in FIG. 1. Moreover, the flux concentrator section 32 features an opening 74 to let the coil core 46 belonging to the outer flux guide unit 24 pass through, as can be seen in FIG. 2. Finally, the flux concentrator section 32 features holes 76 distributed around its circumference for the purpose of attaching the coil core 48 by means of screws or suchlike.

The inner flux guide unit 28 is designed essentially in the same way as the middle flux guide unit 26 and includes a flux concentrator section 34 and four flux collector sections 40 on the inner circumference of and extending perpendicular to the flux concentrator section 34; a central opening 78 to let the flux collector sections 36, 38 of the outer and middle flux guide units 24, 26 pass through, whereby the flux collector sections 30, 32, 34, are offset in relation to each other in such a way that they end up lying next to each other as shown in FIG. 1. In the flux concentrator section 34 of the inner flux guide unit 28, two openings 80, 82 are provided to let the coil core 46 allocated to the outer flux guide unit 24 and the coil core 48 allocated to the middle flux guide unit 26 pass through. Finally, flux concentrator section 34 of the inner flux guide unit 28 also features holes 84 for the purpose of attaching the coil core 50 by means of screws or suchlike.

FIG. 3 shows that the coil core 46 allocated to the outer flux guide unit 24 is essentially the same length as or slightly longer than the flux collector sections 36 of the outer flux guide unit 24; the coil core 48 allocated to the middle flux guide unit 26 is the same length as or slightly longer than the flux collector sections 38 of the middle flux guide unit 26, and the coil core 50, allocated to the inner flux guide unit 28 is the same length as or slightly longer than the flux collector sections 40 of the inner flux guide unit 28.

When the flux guide units 24, 26, 28 and the back iron yoke 38 with the attached coil cores 46, 48, 50 are mounted in the finished electric motor, the flux collector sections 36, 38, 40 extend in an alternating sequence at the inner circumference of the flux concentrator sections 30, 32, 34, parallel to the rotational axis of the permanent magnet and in the vicinity of its poles, whereby the flux collector sections of the outer flux guide units pass through the openings 72, 78.

The coil cores 46, 48, 50 with the toroid coils 52, 54, 56 wound on them extend outside the flux collector sections 36, 38, 40 axially parallel to the permanent magnet, whereby the coil cores carrying the coils are distributed equally around the circumference of the permanent magnet. It should be noted that instead of one coil per phase and flux guide unit of the electric motor, two or three coils, for example, could be provided. The coil cores 46, 48 of the outer flux guide units 24, 26 pass through openings 74, 80, 82 in the inner flux guide units which are provided for this purpose. The length of the coil cores 46, 48, 50 is calculated so that the free ends of the coil cores lie in one plane and can be connected to the back iron yoke 58.

In the electric motor of the present invention, for the toroid coils 52, 54, 56, simple pre-fabricated coils, so-called preformed coils, can be used making the winding process considerably easier than in the case of conventional radial flux machines. All parts of the magnetic circuit and in particular the flux guide units 24, 26, 28 and the back iron yoke 58 can be made from formed sheet metal parts which goes to simplify the manufacturing process even further. Even a laminated stator, as in a conventional radial flux machine, can be used.

The nested design allows the flux collector sections 36, 38, 40 of the flux guide units 24, 26, 28 to lie alternately next to each other on one radius so that a single permanent magnet is sufficient for a three or more phase electric motor and the result is a particularly compact construction. By concentrating the magnetic flux in several flux collector sections per phase, the relationship between the number of flux collector sections, which correspond to the slots of a radial flux motor, and the poles of the permanent magnet can be varied almost at will in order to set a required torque waveform as described in the introductory paragraphs to this application.

By concentrating the magnetic flux via the individual flux collector sections in the flux concentrator section it is also possible to use one or more coils for each phase.

Figure 4:
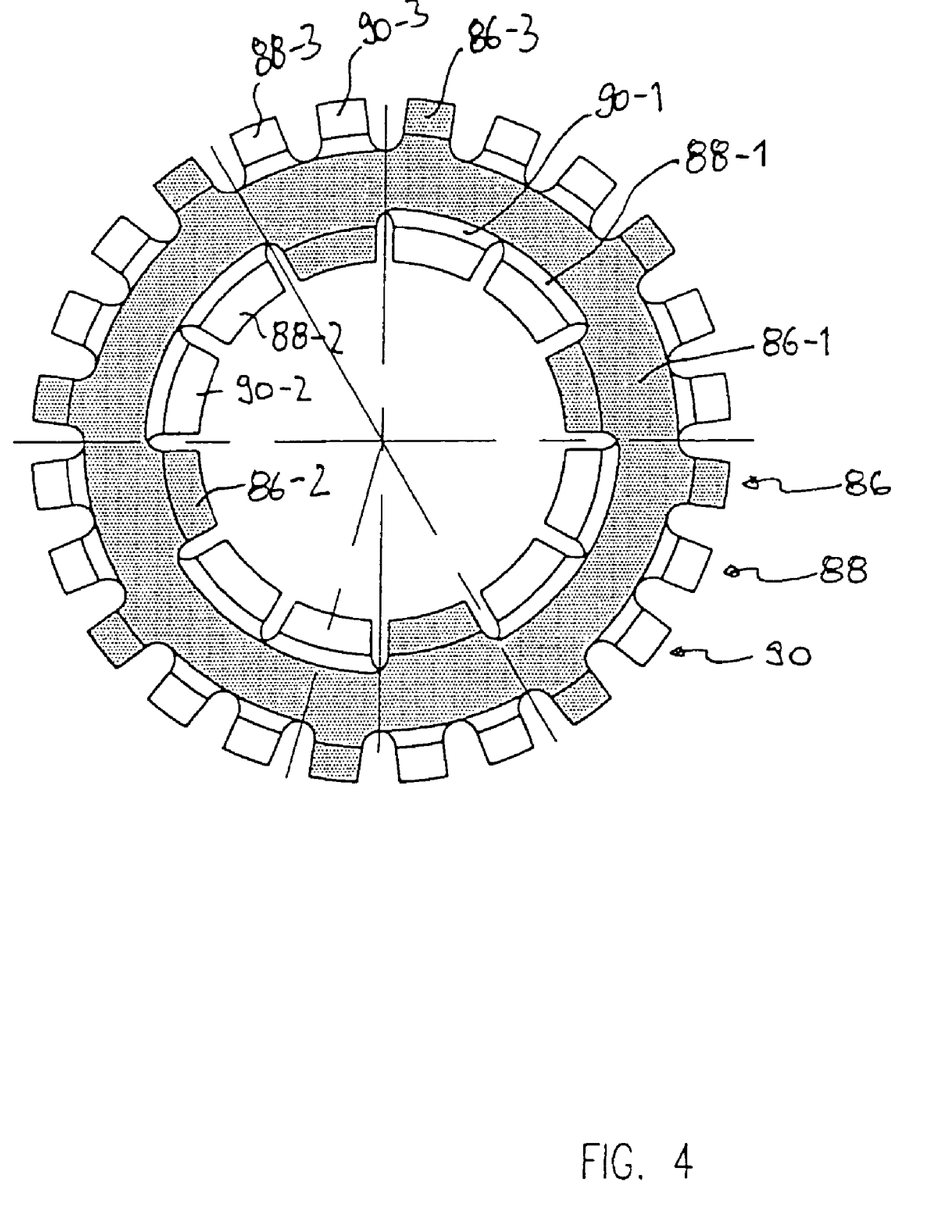
FIG. 4 shows a bottom view of an assembly which includes three pre-mounted flux guide units in accordance with a second embodiment of the invention.

FIG. 4 shows a bottom view of an assembly which includes three pre-mounted flux guide units nested within each other according to a second embodiment of the invention. The innermost flux guide unit is indicated by 86 and the flux guide units located further out are indicated by 88 and 90. In this second embodiment, each flux guide unit has an annular flux concentrator section 86-1, 88-1, 90-1, four flux collector sections 86-2, 88-2, 90-2 and eight coil cores 86-3, 88-3, 90-3, whereby the flux collector sections and the coil cores are connected to their associated flux concentrator section. In the finished motor, the flux collector sections 86-2, 88-2, 90-2 extend axially parallel to the permanent magnet and its rotational axis in the vicinity of the poles of the permanent magnet. They pick up the radial magnetic flux of the permanent magnet and guide it to the associated flux concentrator section 86-1, 88-1, 90-1. Coil cores 86-3, 88-3, 90-3 are provided on the outside of the flux concentrator section 86-1, 88-1, 90-1 which also extend axially parallel to the rotational axis of the permanent magnet. The coil cores of the outer flux guide units 88, 90 pass through cutouts in the inner circumference of the inner flux concentrator sections 86-1, 88-1. The flux guide units 86, 88, 90 according to the second embodiment of the invention are preferably manufactured as punched/bent parts as explained below in reference to FIG. 11. However, the invention is not restricted to a specific means of manufacture and the flux guide units could also be milled, turned or cast and produced as a single piece or made up of several components.

Figure 5:
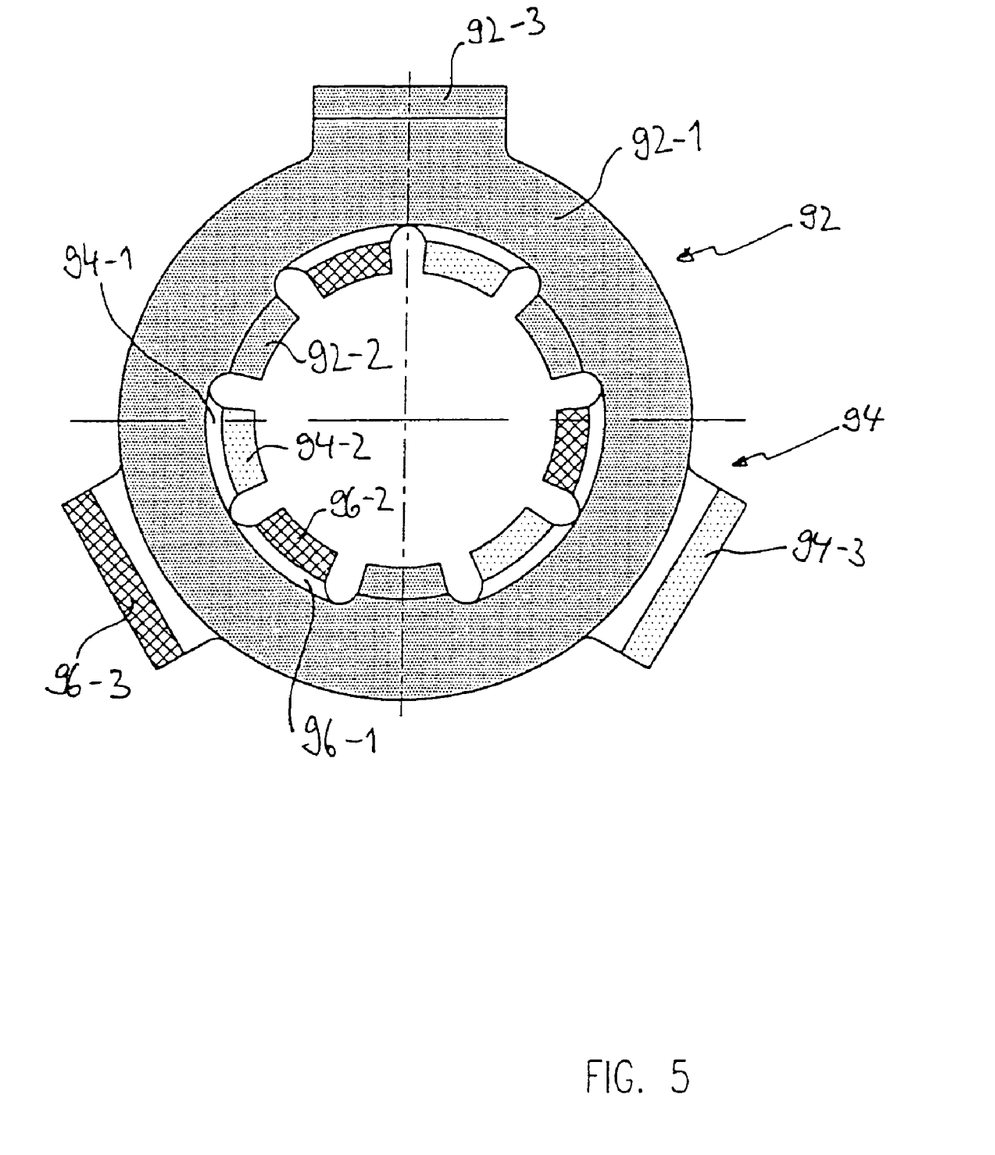
FIG. 5 shows a bottom view of an assembly which includes three pre-mounted flux guide units in accordance with a third embodiment of the invention.

FIG. 5 shows a bottom view of an assembly which includes three pre-mounted flux guide units nested within each other according to a third embodiment of the invention. The innermost flux guide unit is indicated by 92 and the flux guide units located further out are indicated by 94 and 96. In this third embodiment, each flux guide unit has an annular flux concentrator section 92-1, 94-1, 96-1, three flux collector sections 92-2, 94-2, 96-2 and a coil core 92-3, 94-3, 96-3. For the rest, the comments made in respect of the second embodiment also apply to this third embodiment.

Figure 6:
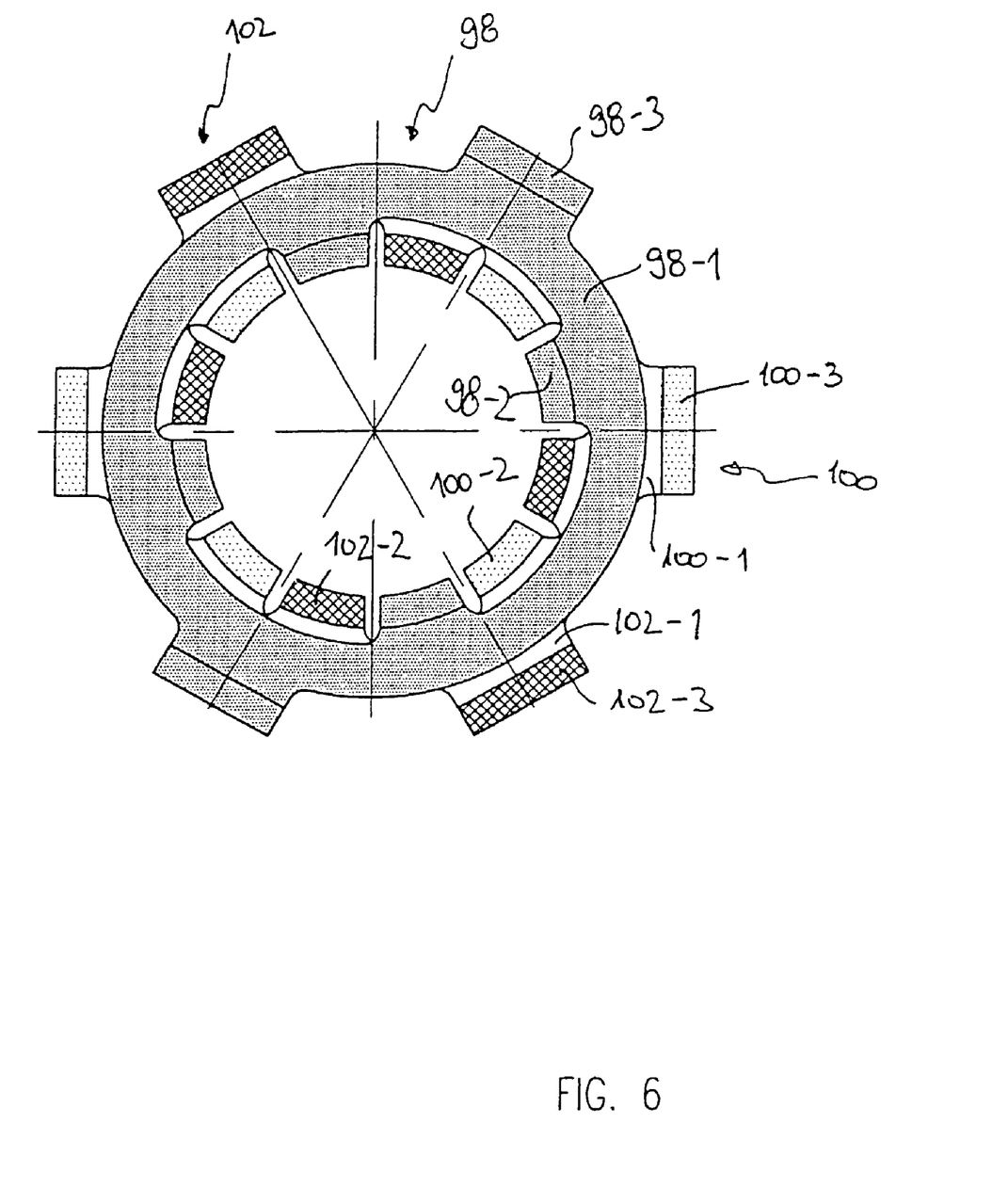
FIG. 6 shows a bottom view of an assembly which includes three pre-mounted flux guide units in accordance with a fourth embodiment of the invention.

FIG. 6 shows a bottom view of an assembly which includes three pre-mounted flux guide units nested within each other according to a fourth embodiment of the invention. The innermost flux guide unit is indicated by 98 and the flux guide units located further out are indicated by 100 and 102. In this fourth embodiment, each flux guide unit has an annular flux concentrator section 98-1, 100-1, 102-1, four flux collector sections 98-2, 100-2, 102-2 and two coil cores 98-3, 100-3, 102-3. For the rest, the comments made in respect of the second embodiment also apply to this fourth embodiment.

Figure 7:
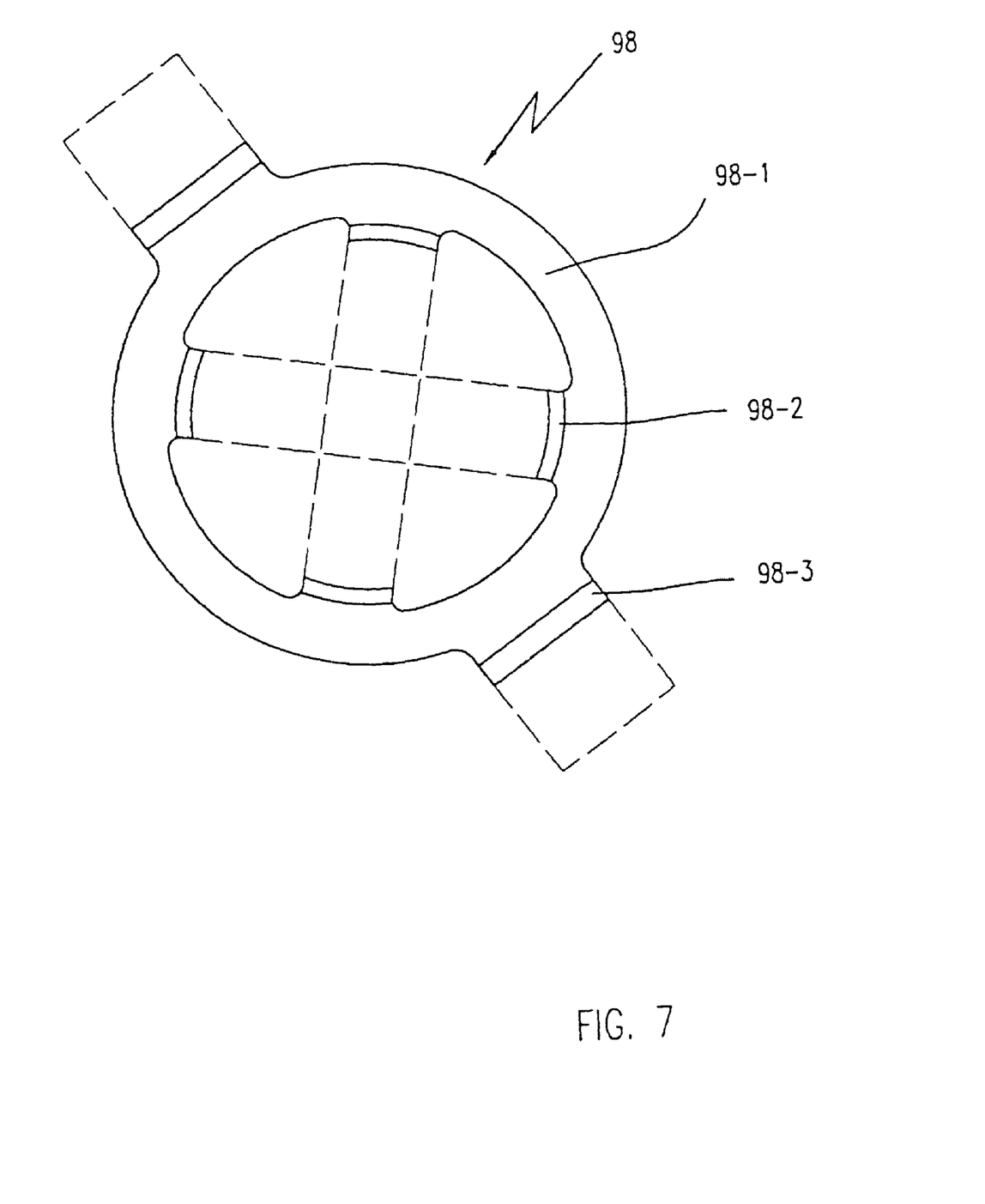
FIG. 7 shows a punched/bent part which can be used to manufacture a flux guide unit in accordance with the fourth embodiment of the invention.
Figure 10:
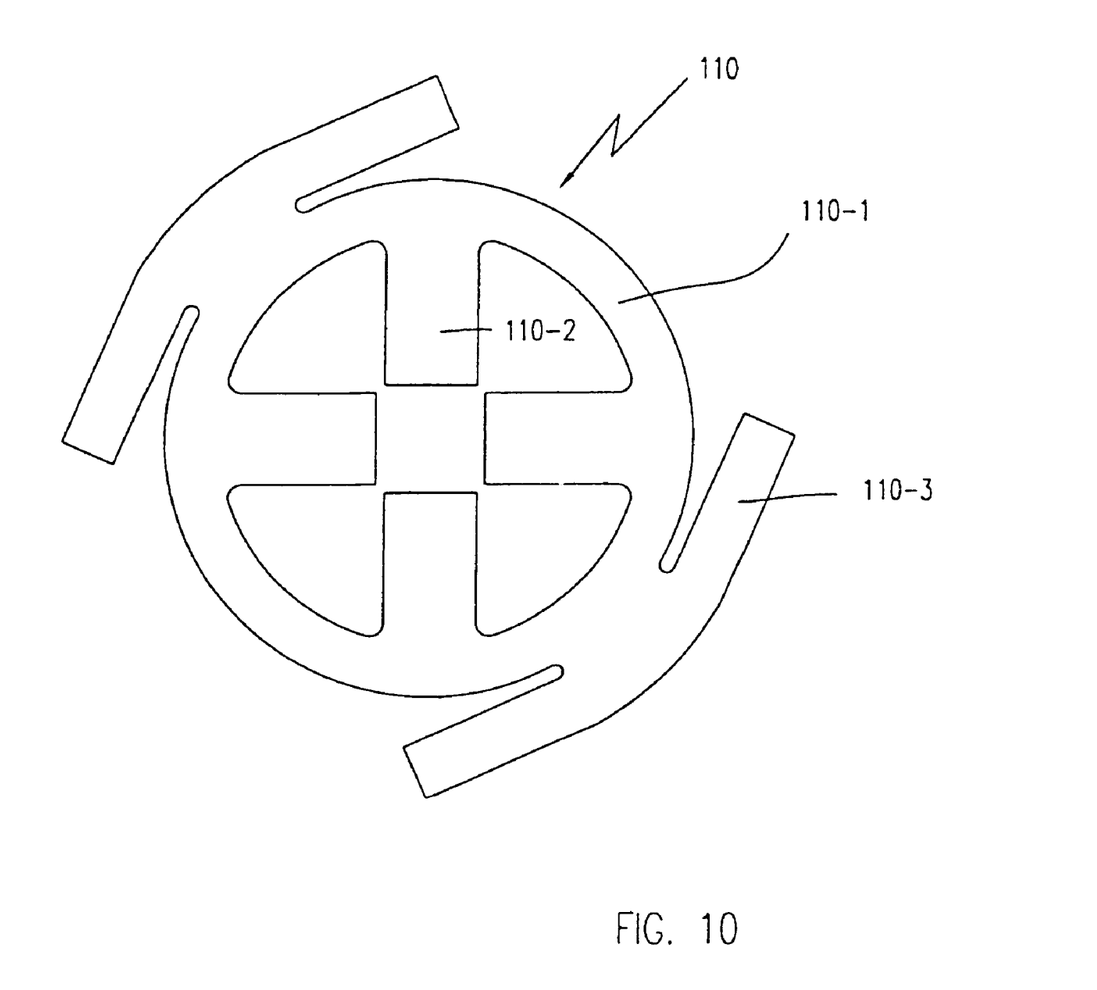
FIG. 10 shows a punched/bent part which can be used to manufacture a flux guide unit in accordance with the sixth embodiment of the invention.

FIG. 7 shows a punched/bent part which can be used, for example, in the manufacture of the flux guide unit 98 in the fourth embodiment of the invention which is shown in FIG. 10. In FIG. 7, the continuous line indicates the flux guide unit 98 with the annular flux concentrator section 98-1, the four flux collector sections 98-2 and the two coil cores 98-3 after the punch/bending process, and the broken line indicates the contour of the punched/bent part before the bending process.

Figure 8:
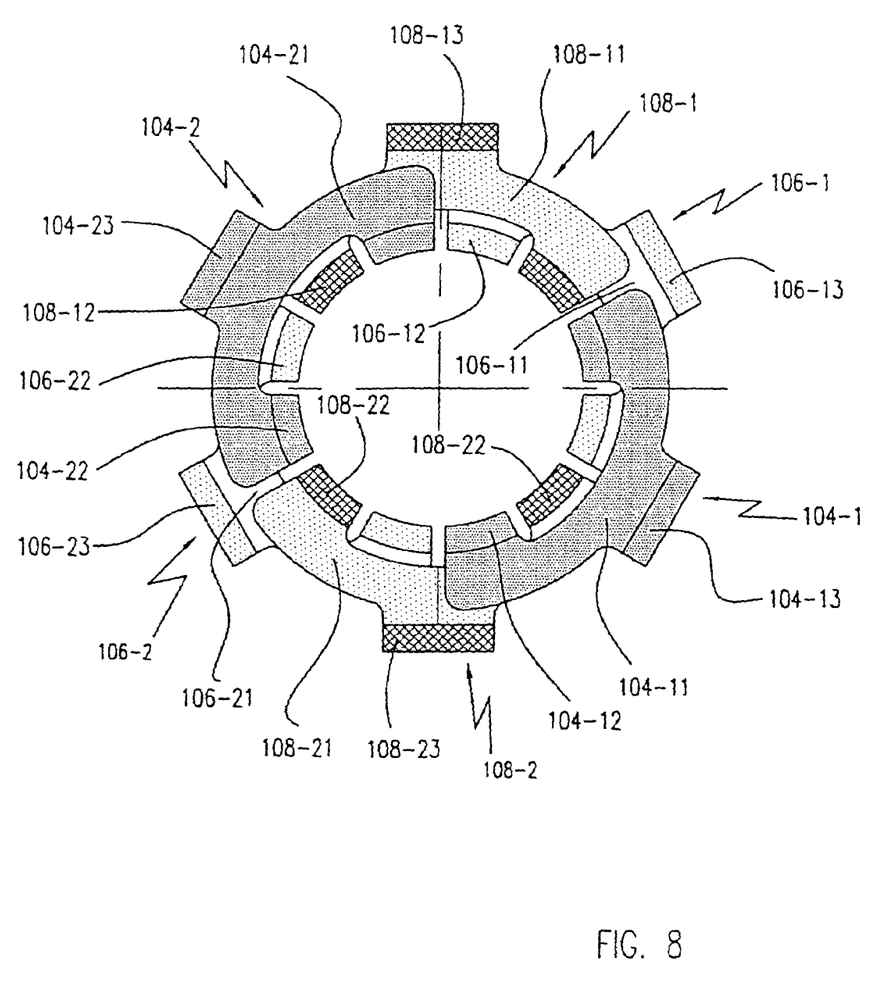
FIG. 8 shows a bottom view of an assembly which includes three pre-mounted flux guide units in accordance with a fifth embodiment of the invention.

FIG. 8 shows a bottom view of an assembly which includes three pre-mounted flux guide units nested within each other according to a fifth embodiment of the invention. In this embodiment, each flux guide unit is divided into two flux guide pieces. The innermost flux guide unit includes two flux guide pieces 104-1 and 104-2, and each of the flux guide units located further out also include two flux guide pieces 106-1 and 106-2 or 108-1 and 108-2 respectively. Each of the two flux guide pieces of a flux guide unit are allocated to one phase of the motor and their flux concentrator sections lie in one plane. In an alternative embodiment, the flux guide piece 104-2 can be laid in one plane with the flux guide pieces 106-1 and 108-2 and the flux guide piece 104-1 in one plane with the flux guide pieces 106-2 and 108-1 with the purpose of minimizing the amount of axial space needed by the nested arrangement made up of the three flux guide units. The axial lengths of the coil cores and flux guide pieces have to be adjusted accordingly.

In this fifth embodiment, each flux guide piece 104-1, 104-2, 106-1, 106-2, 108-1, 108-2 has a flux concentrator section 104-11, 104-21, 106-11, 106-21, 108-11, 108-21 in the form of a part ring which extends in particular over about ⅓ of a circle. Two flux collector sections 104-12, 104-22, 106-12, 106-22, 108-12, 108-22 and a coil core 104-13, 104-23, 106-13, 106-23, 108-13, 108-23 are connected to each flux concentrator section 104-11, 104-21, 106-11, 106-21, 108-11, 108-21 resulting in an overall configuration of four flux collector sections and two coil cores per flux guide unit. The special configuration of the flux guide units in the fifth embodiment, which are made up of two flux guide pieces, can have advantages for the manufacturing process since the individual flux guide pieces can be more easily formed. Another advantage of the fifth embodiment is that the flux concentrator sections, each made up of three flux guide pieces, can be arranged in one plane so that only two planes are needed for the three flux guide units, which means that the amount of space required for the entire assembly consisting of the three flux guide units can be reduced.

For the rest, the comments made in respect of the second embodiment also apply to this fifth embodiment.

Figure 9:
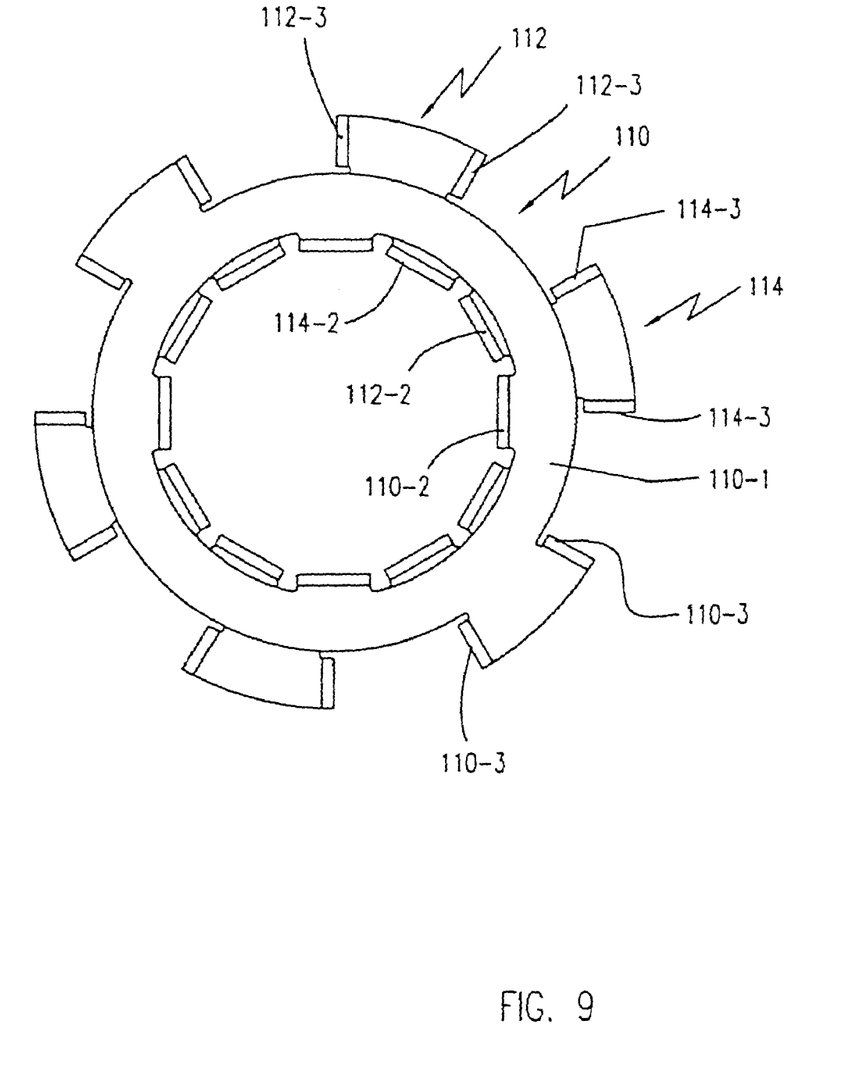
FIG. 9 shows a bottom view of an assembly which includes three pre-mounted flux guide units in accordance with a sixth embodiment of the invention.

FIG. 9 shows a bottom view of an assembly which includes three pre-mounted flux guide units nested within each other according to a sixth embodiment of the invention. The embodiment is similar to the embodiment in FIG. 8 although the number of coil cores for each flux guide unit is doubled. The innermost flux guide unit is indicated by 110 and the flux guide units located further out are indicated by 112 and 114. In this sixth embodiment, each flux guide unit has an annular flux concentrator section 110-1, 112-1, 114-1, four flux collector sections 110-2, 112-2, 114-2 and four coil cores 110-3, 112-3, 114-3. In contrast to the previous embodiments, the longitudinal coil cores 110-3, 112-3, 114-3 do not extend longitudinally in a circumferential direction but rather radially to the rotational axis of the permanent magnet of the electric motors. This embodiment can also have an advantage for the manufacture of the flux guide units as can be seen in FIG. 14. For the rest, the comments made in respect of the second embodiment also apply to this sixth embodiment.

FIG. 10 shows a punched/bent piece which can be used, for example, in the manufacture of the flux guide unit 110 in the sixth embodiment of the invention which is shown in FIG. 13. FIG. 14 shows the flux guide unit 110 with the annular flux concentrator section 110-1, the four flux collector sections 110-2 and the four coil cores 110-3 before the punch/bending process. As can be seen from FIG. 14, the flux guide unit can be manufactured with the optimum utilization of material.

Figure 11:
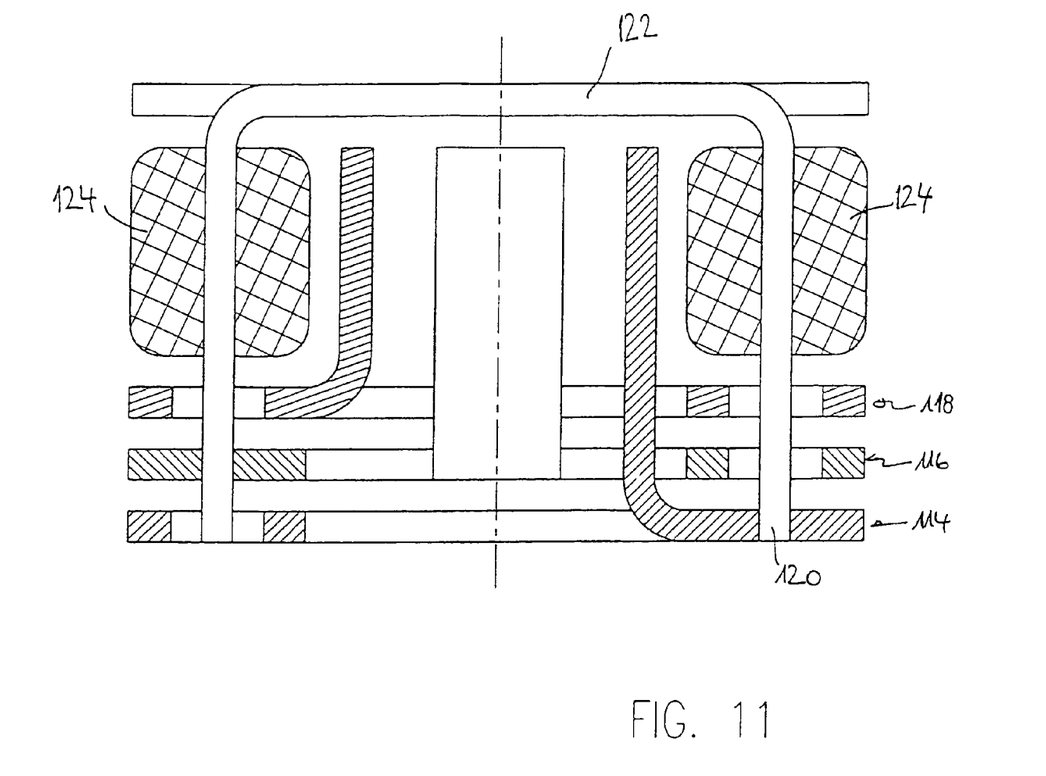
FIG. 11 shows a schematic longitudinal view through the electric motor in accordance with a seventh embodiment of the invention.

FIG. 11 shows a schematic longitudinal view through the electric motor in accordance with a seventh embodiment of the invention which is similar to the view in FIG. 2, whereby in FIG. 11 the rotor and the rotor bearing are not illustrated. In FIG. 11 a first flux guide unit is indicated by 114, a second flux guide unit is indicated by 116 and a third flux guide unit is indicated by 118. The embodiment illustrated in FIG. 11 differs from the previous embodiments in that the coil cores, e.g. 120, are formed as a single piece with the back iron yoke 122. Thus, in this seventh embodiment, the coil cores, e.g. 120, are first formed as one piece with the back iron yoke 122, then the coils 124 are placed on the coil cores before the back iron yoke 122, together with the coils 124, is fitted to the flux guide units 114, 116, 118. For the rest, the comments made for the first embodiment with reference to FIG. 2 apply.

In designing the rotor shaft 14 from a magnetically non-conductive material, or by using any other suitable means of magnetically de-coupling the stator and rotor, it is possible to integrate the bearing carriers 66, 68 for the rotor shaft bearings 60, 62 into the magnetic circuit and thus eliminate the need for additional motor flanges. In the preferred embodiment of the invention, the bearing carriers are integrated into the outer flux collector 24 and the back yoke ring 58.

The characteristics revealed in the above description, the claims and the figures can be important for the realization of the invention in its various embodiments both individually and in any combination whatsoever.

The invention claimed is:

1. An electronically commutated electric motor comprising: a multi-pole permanent magnet (18), a plurality of flux guide units (24, 26, 28) each of the flux guide units having at least one flux collector section (36, 38, 40) and one flux concentrator section (30, 32, 34), wherein each flux guide unit (24, 26, 28) detects a radial magnetic flux from the permanent magnet (18) and redirects the radial magnetic flux to a corresponding transversal magnetic flux; and a plurality of coils (52, 54, 56), each coil in communication with a flux guide unit (24, 26, 28); wherein the flux guide units (24, 26, 28) are nested within each other such that the flux collector sections (36) of a flux guide unit (24) passes through a cavity (72, 78) of another flux guide unit (26, 28).

2. The electric motor according to claim 1, wherein the permanent magnet is arranged annularly on the rotor (10).

3. The electric motor according to claim 1, further comprising a back yoke (16) for receiving the permanent magnet (18).

4. The electric motor according to claim 1, wherein the coils (52, 54, 56) are arranged on a corresponding coil core (46, 48, 50).

5. The electric motor according to claim 4, wherein the coil cores (46, 48, 50) are coupled to a back iron yoke (58).

6. The electric motor according to claim 4, wherein the flux guide units (24, 26, 28) are arranged coaxially one on top of one other such that the flux collector sections (36) and coil cores (46) of pass through cutouts (72, 78) in an inner flux guide unit (26, 28).

7. The electric motor according to claim 1, wherein the flux concentrator section (30, 32, 34) of a flux guide unit (24, 26, 28) is essentially concentric with the permanent magnet (18).

8. The electric motor according to claim 1, wherein the flux collector sections (36, 38, 40) are arranged circumferentially about an associated flux concentrator (30, 32, 34).

9. The electric motor according to claim 1, wherein each flux guide unit (24, 26, 28) is associated with a phase of the electric motor.

10. The electric motor according to claim 1, wherein one or four coils (52, 54, 56) are provided for each phase of the electric motor.

11. The electric motor according to claim 5, wherein an outer flux guide unit (24) and the back iron yoke (58) each accommodate bearings (60, 62) to support a rotor shaft (14).

12. The electric motor according to claim 1, wherein each flux guide unit (24, 26, 28) comprises a number of flux collector sections (36, 38, 40) which are regularly spaced in a circle concentric to the permanent magnet (18).

13. The electric motor according to claim 1, wherein the motor is an inner rotor motor or an outer rotor motor.

14. The electric motor according to claim 1, wherein the flux collector sections (36, 38, 40) are attached to the inner circumference of a flux concentrator section (30, 32, 34).

15. The electric motor according to claim 12, wherein a flux collector (36, 38, 40) and a flux concentrator (30, 32, 34) substantially form a right angle.

16. The electric motor according to claim 1, wherein the flux collector sections (36, 38, 40) are interposed between the magnet (18) and the coils (52, 54, 56).

17. The electric motor according to claim 1, wherein the electric motor is an electronically commutated DC motor.

18. The electric motor according to claim 1, wherein at least one coil is axially parallel to the permanent magnet (18).

19. The electric motor according to claim 1, wherein the permanent magnet is concentric with a shaft (14) of the rotor (10).

20. The electric motor according to claim 4, wherein at least one coil core (46, 48, 50) is axially parallel to the permanent magnet (18).

21. The electric motor according to claim 4, wherein at least one coil core (46, 48, 50) communicates with at least one flux concentrator (30, 32, 34).

22. The electric motor according to claim 1, wherein at least one flux collector (36, 38, 40) is axially parallel to the permanent magnet (18).

* * * * *